(12) United States Patent
Yang et al.

(10) Patent No.: US 9,042,053 B1
(45) Date of Patent: May 26, 2015

(54) THERMALLY STABILIZED PERPENDICULAR MAGNETIC RECORDING MEDIUM

(71) Applicant: WD Media, LLC, San Jose, CA (US)

(72) Inventors: Yang Yang, Singapore (SG); Iwao Okamoto, Singapore (SG)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 14/313,910

(22) Filed: Jun. 24, 2014

(51) Int. Cl.
*G11B 5/74* (2006.01)
*G11B 5/66* (2006.01)
*G11B 5/65* (2006.01)

(52) U.S. Cl.
CPC . *G11B 5/66* (2013.01); *G11B 5/656* (2013.01)

(58) Field of Classification Search
CPC .................................. G11B 5/74; G11B 5/746
USPC ......................................... 360/135
See application file for complete search history.

(56) References Cited

U.S. PATENT DOCUMENTS

| | | | |
|---|---|---|---|
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |

(Continued)

*Primary Examiner* — Allen T Cao

(57) ABSTRACT

A magnetic recording medium including a substrate, and at least one magnetic layer formed on the substrate. The magnetic layer is formed from an alloy containing Cobalt, and Platinum (Pt). The magnetic layer is also formed from grain boundary segregation materials comprising Manganese Oxide and at least one of Silicon Oxide, Chromium Oxide, and Cobalt Oxide (CoO).

28 Claims, 4 Drawing Sheets

(56) References Cited

U.S. PATENT DOCUMENTS

| | | |
|---|---|---|
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,186,471 B2 | 3/2007 | Lu et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,381,480 B2 | 6/2008 | Nakamura et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,494,617 B2 | 2/2009 | Ziani |
| 7,494,726 B2 | 2/2009 | Watanabe et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,993,766 B2 | 8/2011 | Sun et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,270,286 B2 | 9/2012 | Kanbe et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |

(56) References Cited

U.S. PATENT DOCUMENTS

| | | |
|---|---|---|
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2002/0060883 A1 | 5/2002 | Suzuki |
| 2003/0022024 A1 | 1/2003 | Wachenschwanz |
| 2003/0162055 A1* | 8/2003 | Lu et al. ............... 428/694 MT |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0200133 A1* | 8/2007 | Hashimoto et al. ........... 257/100 |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0073813 A1 | 3/2010 | Dai et al. |
| 2010/0110576 A1 | 5/2010 | Akagi et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0300600 A1 | 11/2012 | Kanbe et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |

* cited by examiner

Overview-Background

THERMALLY STABILIZED PERPENDICULAR MAGNETIC RECORDING MEDIUM

FIELD

The present disclosure relates generally to magnetic recording media, and in particular information storage devices, and in particular to a disk drive having a disk clamp having a non-circular opening and a hub having a non-circular protrusion that is inserted into the non-circular opening.

BACKGROUND

FIG. 2 is a cross-sectional view of a perpendicular magnetic recording medium 200 according to related art. The medium 200 includes a substrate 202, and an adhesion layer 204 formed on the substrate 202. As illustrated, the medium 200 also includes a pair of soft under-layers 206, 210 with a spacer layer 208 formed therebetween. FIG. 2 also illustrates that a seed layer 212 is formed on the upper soft-underlayer 210, and a pair of intermediate layers 214, 216 formed on the seed layer 212. Further, a non-magnetic granular layer 218 is formed on the upper intermediate layer 216 to allow the growth of one or more recording layer units 236, 238, 240.

As illustrated, three recording layer units 236, 238, 240 are provided in the medium 200. The lower recording layer unit 236 includes a lower magnetic layer 220 formed on the non-magnetic granular layer 218 and a lower exchange breaking layer 222 formed on the lower magnetic layer 220. The middle recording layer unit 238 includes a middle magnetic layer 224 formed on the lower exchange breaking layer 222 and a middle exchange breaking layer 226 formed on the middle magnetic layer 224. The upper recording layer unit 240 includes an upper magnetic layer 226 formed on the middle exchange breaking layer 226 and an upper exchange breaking layer 230 formed on the upper magnetic layer 228. A metallic CAP layer 232 is formed on the upper exchange breaking layer 232 and a protective carbon overcoat layer 234 is formed on the metallic CAP layer 232.

In the related art storage medium 200 of FIG. 2, each of the magnetic layers 220, 224, 228 is formed from a magnetic alloy containing one or more of Cobalt (Co), Platinum (Pt), and Chromium (Cr) and grain boundary segregation materials formed from one or more of Silicon Oxide ($SiO_2$), Chromium Oxide ($Cr_2O_3$), and Cobalt Oxide (CoO). Each of the magnetic layers 220, 224, 228 may also include Boron (B) and/or Ruthenium (Ru). Further, the lower and middle exchange breaking layers 222 and 226 are formed from an alloy of Co and Cr and grain boundary segregation materials formed from Titanium Oxide ($TiO_2$). Additionally, the upper exchange blocking layer 230 may be formed from an alloy containing Co and Ru.

The continued demand for Hard Disk Drives (HDD) with lower cost and larger capacity has driven the production of media, such as that illustrated in FIG. 2, which have higher areal density. However, in media such as that illustrated in FIG. 2, the physical limitation of write-head field strengths can restrict improvements in the Signal to Noise Ratio (SNR) required to maintain the higher areal density. Specifically, as grain size is reduced to improve SNR, it becomes necessary to increase magnetic field strength during magnetic reversal (i.e. the anisotropy field) of each grain in order to secure thermal stability for longer duration storage of recoded bits.

There is therefore a need for an improved disk media material that that may realize improved SNR and a higher thermal stability factor without sacrificing writability.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
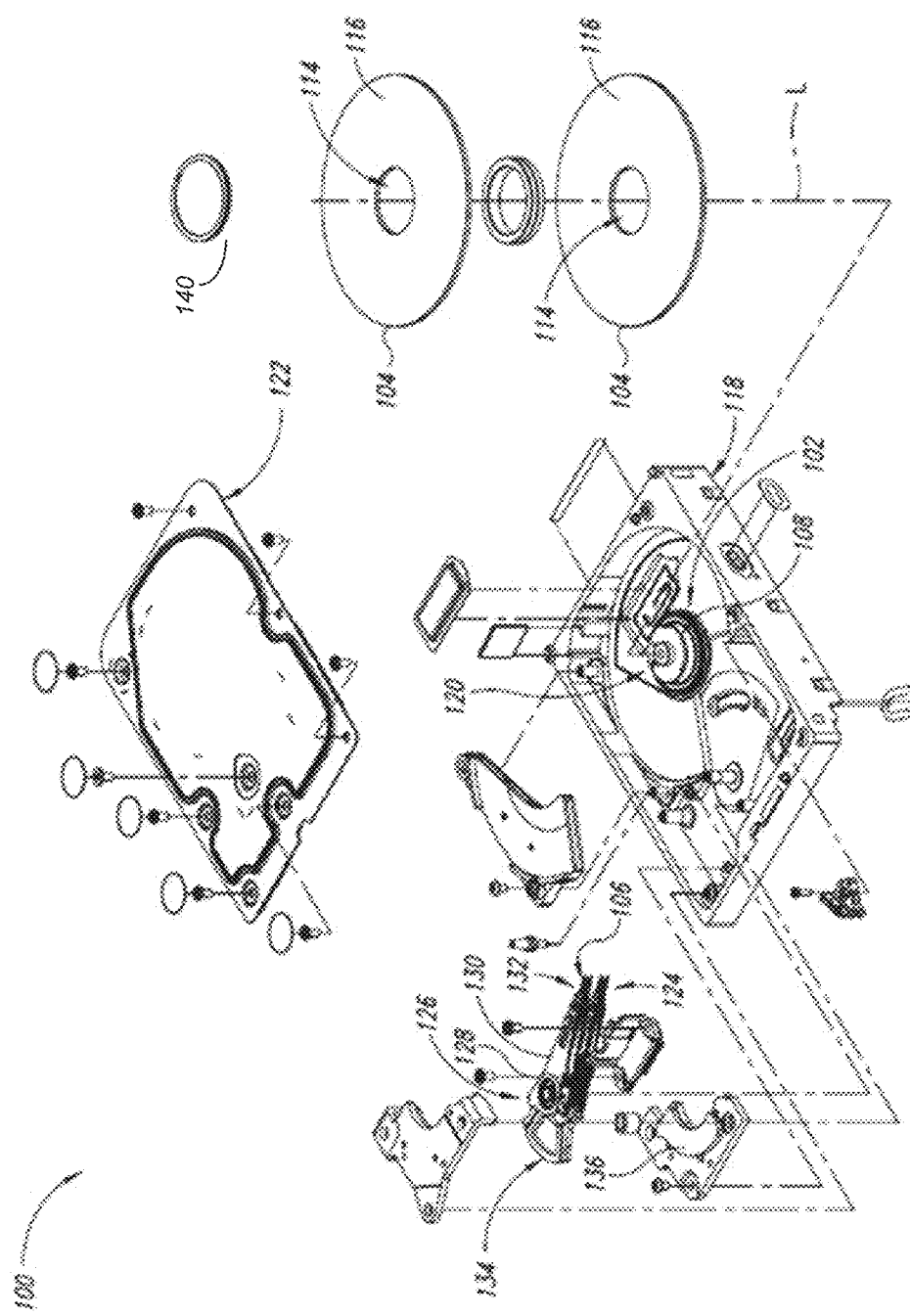
FIG. 1 is an exploded, perspective view generally illustrating a disk drive, which can use a recording medium according to an embodiment of the present application.

Referring to FIG. 1, a storage disk drive assembly 100 is generally illustrated. The disk drive 100 comprises a hub 102, a disk 104 physically contacting and supported by the hub 102, and a head 106 operable to write to and read from the annular disk 104. In one embodiment, the hub 102 comprises a substantially cylindrical portion 108 which define a longitudinal axis L.

As illustrated herein, the disk drive 100 comprises a magnetic disk drive, and the structures and methods described herein will be described in terms of such a disk drive.

The disks 104 may comprise any of a variety of magnetic media (300, 400, 500, 600, 700) according to one or more embodiments of the present application as discussed below with respect to FIGS. 3-7. The disks 104 having a substantially concentric opening 114 defined there through. Of course, in other embodiments, the disk drive 100 may include more or fewer disks. For example, the disk drive 100 may include one disk or it may include two or more disks. The disks 104 each include a disk surface 116, as well as an opposing disk surface not visible in FIG. 1. In one embodiment, the disk surfaces 116 comprise a plurality of generally concentric tracks for storing data.

As illustrated, the hub 102 may be coupled to and support the disks 104. The hub 102 may also be rotatably attached to a motor base 118 of the disk drive 100, and may form one component of a motor 120 (e.g., a spindle motor). The motor 120 and the hub 102 may be configured to rotate the disks 104 about the longitudinal axis L.

Further, a disk clamp 140 may be coupled to the hub 102 to provide a downward clamping force to the disks 104. Specifically, the disk clamp 140 may be positioned above the disks 104 and attached to an upper surface or a side surface of the hub 102.

The disk drive 100 may further include a cover 122, which, together with the motor base 118, may house the disks 104 and the motor 120. The disk drive 100 may also include a head stack assembly ("HSA") 124 rotatably attached to the motor base 118. The HSA 124 may include an actuator 126 comprising an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding disk 104. The HSA 124 may further include a coil 134 through which a changing electrical current is passed during operation. The coil 134 interacts with one or more magnets 136 that are attached to the motor base 118 to form a voice coil motor ("VCM") for controllably rotating the HSA 124.

The head 106 may comprise any of a variety of heads for writing to and reading from a disk 104. In magnetic recording applications, the head 106 may include an air bearing slider and a magnetic transducer that includes a writer and a read element. The magnetic transducer's writer may be of a longitudinal or perpendicular design, and the read element of the magnetic transducer may be inductive or magneto resistive.

The disk drive 100 may further include a printed circuit board ("PCB") (not shown). The PCB may include, inter alia, a disk drive controller for controlling read and write operations and a servo control system for generating servo control signals to position the actuator arms 130 relative to the disks 104.

Figure 2:
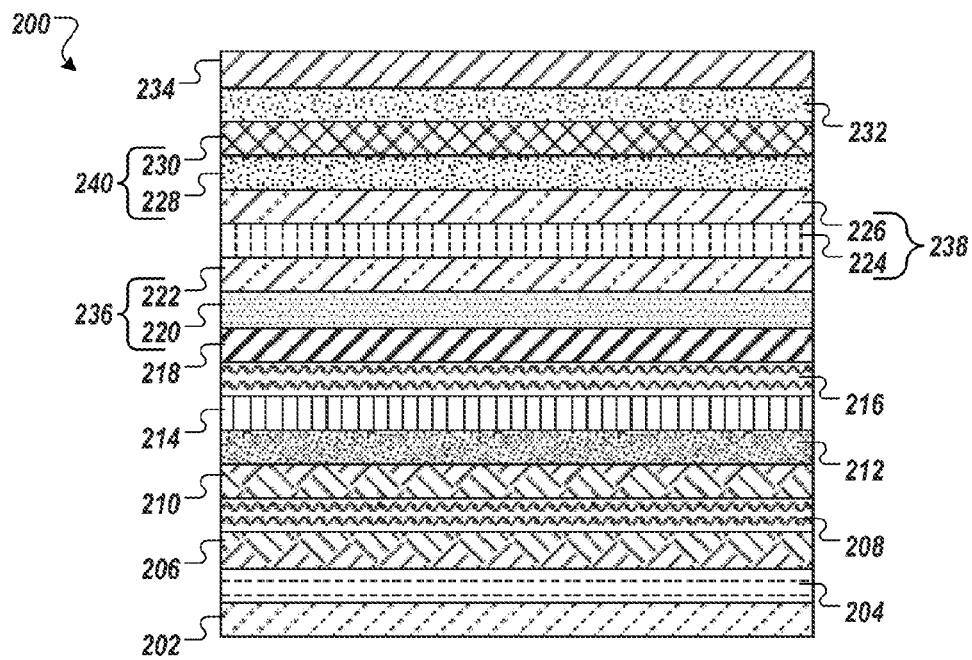
FIG. 2 is a cross-sectional view of a perpendicular magnetic recording medium according to related art.
Figure 3:
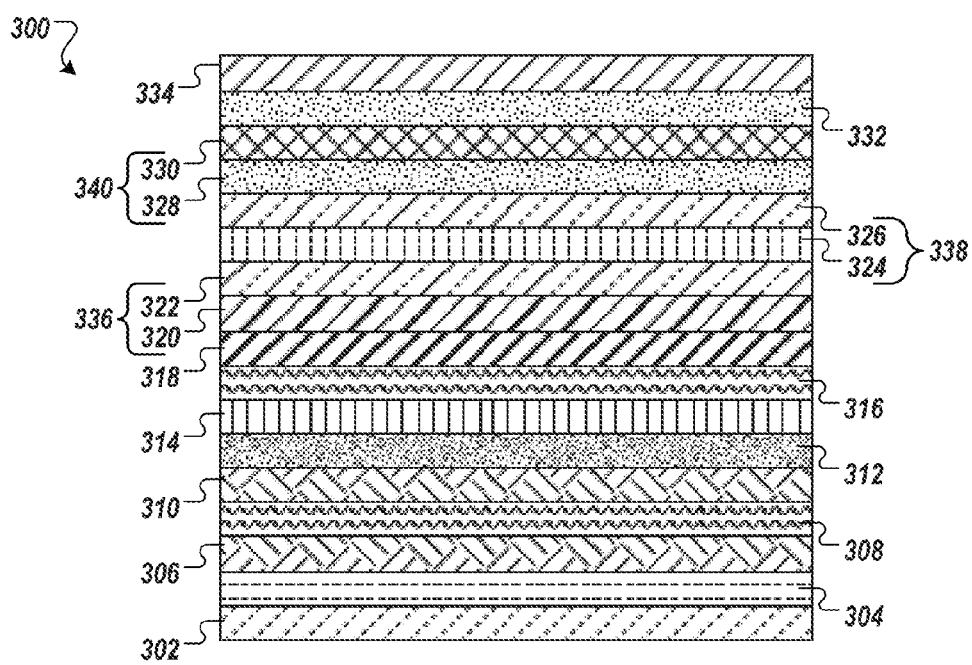
FIG. 3 is a cross-sectional view of a perpendicular magnetic recording medium according to a first embodiment of the present application.

FIG. 3 is a cross-sectional view of a perpendicular magnetic recording medium 300 according to a first embodiment. Similar to the medium 200 illustrated in FIG. 2, the medium 300 includes a substrate 302, and an adhesion layer 304 formed on the substrate 302. In some embodiments, the substrate 302 may be formed as a glass disk. However, the material of the substrate 302 is not particularly limited and may include aluminosilicate glass, soda lime glass, soda aluminosilicate glass, aluminoborosilicate glass, borosilicate glass, quartz glass, chain silicate glass, glass ceramics such as crystallized glass, or any other material that may be apparent to a person of ordinary skill in the art. Further, the adhesion layer 304 may be formed by a thin-film provided on the substrate 302 to increase adhesion of the other layers formed on the substrate 302. In some embodiments, adhesion layer 304 may be formed from an alloy of Chromium Cr and Titanium (Ti). However, embodiments of the present application are not limited to this alloy and may be formed from any other adhesion layer material as may be apparent to a person of ordinary skill in the art.

Further, the medium 300 also includes a pair of soft under-layers 306 and 310 with a spacer layer 308 formed therebetween. In some embodiments, the soft under-layers 306, 310 may be formed as a Co—Fe amorphous Soft under-layer. Further, in some embodiments the spacer layer 308 is formed from a thin-film of Ru. However, embodiments of the present application are not limited to a Ru layer, and may be formed from other materials as may be apparent to a person of ordinary skill in the art.

As also illustrated in FIG. 3, the medium includes a seed layer 312 is formed on the upper soft-underlayer 310. In some embodiments, the seed layer 312 may be formed from a Nickel (Ni) alloy. Further, in some embodiments, the seed layer 312 may be formed from an alloy containing Ni, Tungsten (W), Aluminum (Al) and Fe. However, embodiments of the present application are not limited to these alloys and may be formed from other materials as may be apparent to a person of ordinary skill in the art.

The medium 300 also includes a pair of intermediate layers 314, 316 formed on the seed layer 312. In some embodiments, the lower intermediate layer 314 is formed from an alloy containing Ru. Further, in some embodiments, the lower intermediate layer 314 is formed from pure Ru or an alloy containing Ru. However, embodiments of the present application are not limited to these alloys and may be formed from other materials as may be apparent to a person of ordinary skill in the art. Additionally, in some embodiments the upper intermediate layer 316 is formed from a thin-film of Ru. However, embodiments of the present application are not limited to a Ru layer, and may be formed from other materials as may be apparent to a person of ordinary skill in the art.

FIG. 3 also illustrates that the medium 300 also includes a non-magnetic granular layer 318 is formed on the upper intermediate layer 316 to allow the growth of one or more recording layer units 336, 338, 340. The non-magnetic granular layer 318 may comprise an alloy, and grain boundary segregation materials. In some embodiments of the granular layer 318, the alloy may contain Co and Cr and the grain boundary segregation materials may contain CoO. Further, in some embodiments, the alloy may contain Co, Cr, and Ru and the grain boundary segregation materials may contain CoO and $TiO_2$.

As illustrated, three recording layer units 336, 338, 340 are provided in the medium 300. The lower recording layer unit 336 includes a lower magnetic layer 320 formed on the non-magnetic granular layer 318 and a lower exchange breaking layer 322 formed on the lower magnetic layer 320. Further, the middle recording layer unit 338 includes a middle magnetic layer 324 formed on the lower exchange breaking layer 322 and a middle exchange breaking layer 326 formed on the middle magnetic layer 324. Additionally, the upper recording layer unit 340 includes an upper magnetic layer 328 formed on the middle exchange breaking layer 326 and an upper exchange breaking layer 330 formed on the upper magnetic layer 328.

In the embodiment of FIG. 3, the lower magnetic layer 320 of the lower recording layer unit 336 includes an alloy of Co and Pt, and grain boundary segregation materials including Manganese Oxide (MnO) and one or more of $SiO_2$, $Cr_2O_3$, and CoO. In some embodiments, the alloy of the lower magnetic layer 320 may also include B.

Further, the middle and upper magnetic layers 324, 328 may be formed from a magnetic alloy containing one or more of Co, Pt, and Cr and grain boundary segregation materials formed from one or more of $SiO_2$, $Cr_2O_3$, and CoO. In some embodiments, the alloy of the middle and upper magnetic layers 324, 328 may also include B.

Further, the lower and middle exchange breaking layers 322 and 326 may be formed from an alloy containing one or more of Co and Cr, and grain boundary segregation materials formed from $TiO_2$. Additionally, the upper exchange blocking layer 330 may be formed from an alloy containing Co and Ru.

The medium 300 also includes a metallic cap layer 332 is formed on the upper exchange breaking layer 330. In some embodiments, the metallic cap layer 332 may be formed from an alloy containing one or more of Co, Cr, and Pt. Further in some embodiments, the metallic cap layer 332 may also include B.

The medium 300 also includes a protective carbon overcoat layer 234 formed on the metallic CAP layer 332 to protect the medium 300 from impacts of the magnetic head 106.

The processes of forming the above discussed layers of the medium 300 are not particularly limited and may include deposition processes (such as Chemical Vapor Deposition), sputtering processes, or any other process that may be apparent to a person of ordinary skill in the art.

Figure 4:
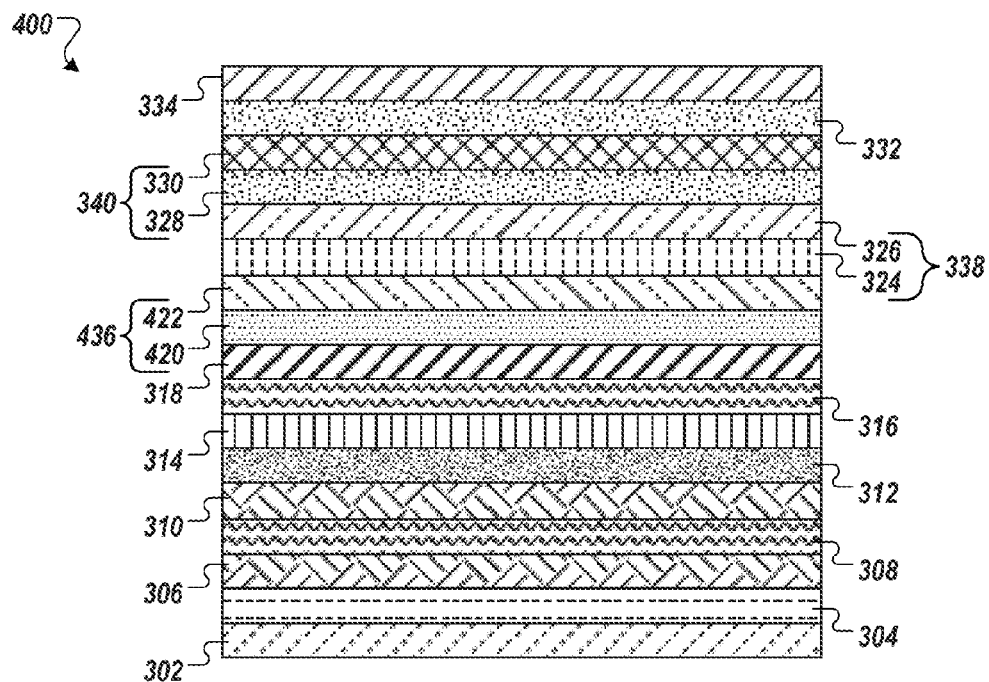
FIG. 4 is a cross-sectional view of a perpendicular magnetic recording medium according to a second embodiment of the present application.

FIG. 4 is a cross-sectional view of a perpendicular magnetic recording medium 400 according to a second embodiment. In FIG. 4, reference numerals matching reference numerals used in FIG. 3 have been used to represent elements common between the first and second embodiments. Redundant description of common elements represented by matching reference numerals may be omitted.

In the embodiment of FIG. 4, the lower recording layer unit 436 includes a lower magnetic layer 420 formed on the non-magnetic granular layer 318 and a lower exchange breaking layer 422 formed on the lower magnetic layer 420. In this embodiment, the lower magnetic layer 420 of the lower recording layer unit 436 may be formed from a magnetic alloy containing one or more of Co, Pt, and Cr and grain boundary segregation materials formed from one or more of $SiO_2$, $Cr_2O_3$, and CoO similar to the composition of the middle and upper magnetic layers 324, 328. In some embodiments, the alloy of the lower magnetic layers 420 may also include Boron B.

Further, the lower exchange breaking layer 422 and is formed from an alloy containing one or more of Co and Cr, and grain boundary segregation materials formed from MnO. Additionally, in some embodiments, grain boundary segregation material of the lower exchange breaking layer 422 may also contain $TiO_2$.

Again, the processes of forming the above discussed layers of the medium 400 are not particularly limited and may include deposition processes (such as Chemical Vapor Deposition), sputtering processes, or any other process that may be apparent to a person of ordinary skill in the art.

Figure 5:
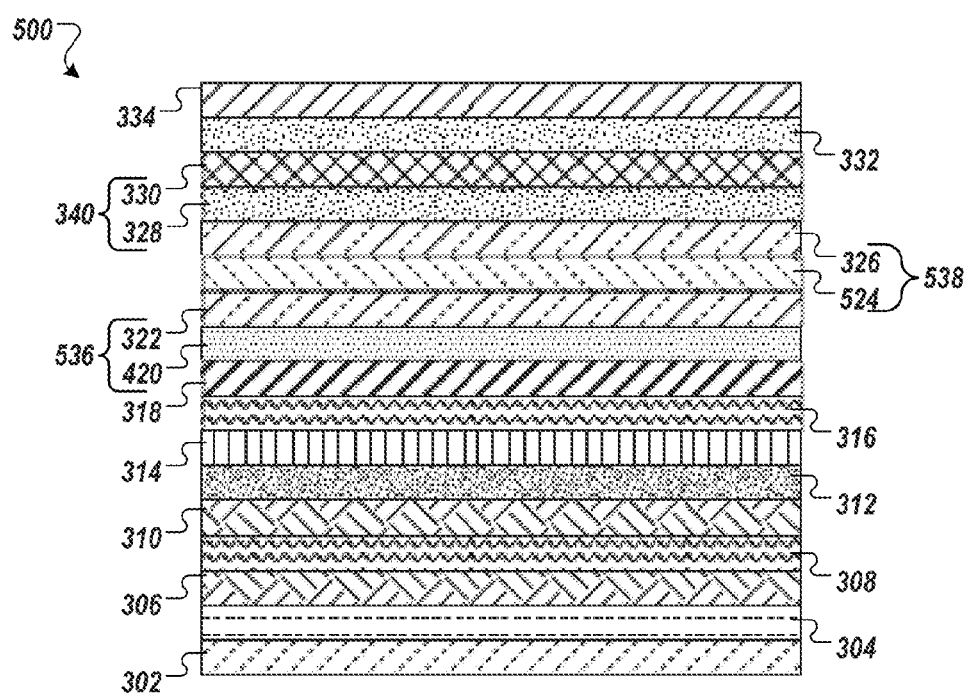
FIG. 5 is a cross-sectional view of a perpendicular magnetic recording medium according to a third embodiment of the present application.

FIG. 5 is a cross-sectional view of a perpendicular magnetic recording medium 500 according to a third embodiment. In FIG. 5, reference numerals matching reference numerals used in FIGS. 3 and 4 have been used to represent elements common between the first, second, and third embodiments. Redundant description of the common elements represented by matching reference numerals may be omitted.

In the embodiment of FIG. 5, the lower recording layer unit 536 includes a lower magnetic layer 420 formed on the non-magnetic granular layer 318 and a lower exchange breaking layer 322 formed on the lower magnetic layer 420. Further, the medium 500 also includes a middle recording layer unit 538 including a middle magnetic layer 524 formed on the lower exchange breaking layer 322 and a middle exchange breaking layer 326 formed on the middle magnetic layer 524.

As in the embodiment of FIG. 4, the lower magnetic layer 420 of the lower recording layer unit 536 of the medium 500 may be formed from a magnetic alloy containing one or more of Co, Pt, and Cr and grain boundary segregation materials formed from one or more of $SiO_2$, $Cr_2O_3$, and CoO. In some embodiments, the alloy of the lower magnetic layer 420 may also include B. Further, the lower exchange breaking layer 322 and the middle exchange breaking layer 326 are formed from an alloy containing one or more of Co and Cr, and grain boundary segregation materials formed from $TiO_2$.

In the embodiment of FIG. 5, the middle magnetic layer 524 of the middle recording layer unit 538 includes an alloy of Co and Pt, and grain boundary segregation materials including MnO and one or more of $SiO_2$, $Cr_2O_3$, and CoO. In some embodiments, the alloy of the middle magnetic layer 524 may also include B.

Again, the processes of forming the above discussed layers of the medium 500 are not particularly limited and may include deposition processes (such as Chemical Vapor Deposition), sputtering processes, or any other process that may be apparent to a person of ordinary skill in the art.

Figure 6:
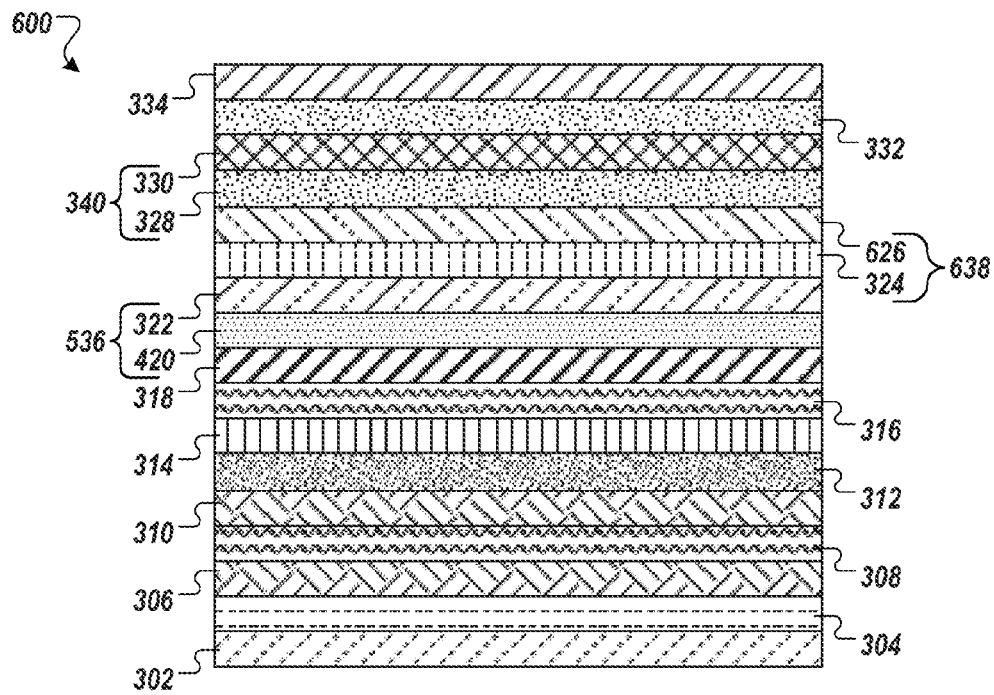
FIG. 6 is a cross-sectional view of a perpendicular magnetic recording medium according to a fourth embodiment of the present application.

FIG. 6 is a cross-sectional view of a perpendicular magnetic recording medium 600 according to a fourth embodiment. In FIG. 6, reference numerals matching reference numerals used in FIGS. 3-5 have been used to represent elements common between the first, second, third and fourth embodiments. Redundant description of the common elements represented by matching reference numerals may be omitted.

In the embodiment of FIG. 6, the middle recording layer unit 638 includes a lower magnetic layer 320 formed on the lower exchange breaking layer 322 and a middle exchange breaking layer 626 formed on the middle magnetic layer 324. In this embodiment, the middle magnetic layer 324 of the middle recording layer unit 438 may be formed from a magnetic alloy containing one or more of Co, Pt, and Cr and grain boundary segregation materials formed from one or more of $SiO_2$, $Cr_2O_3$, and CoO similar to the composition of the lower and upper magnetic layers 420, 328. In some embodiments, the alloy of the middle magnetic layers 324 may also include B.

Further, the middle exchange breaking layer 626 and is formed from an alloy containing one or more of Co and Cr, and grain boundary segregation materials formed from MnO. Additionally, in some embodiments, grain boundary segregation material of the middle exchange breaking layer 626 may also contain $TiO_2$.

Again, the processes of forming the above discussed layers of the medium 600 are not particularly limited and may include deposition processes (such as Chemical Vapor Deposition), sputtering processes, or any other process that may be apparent to a person of ordinary skill in the art.

Figure 7:
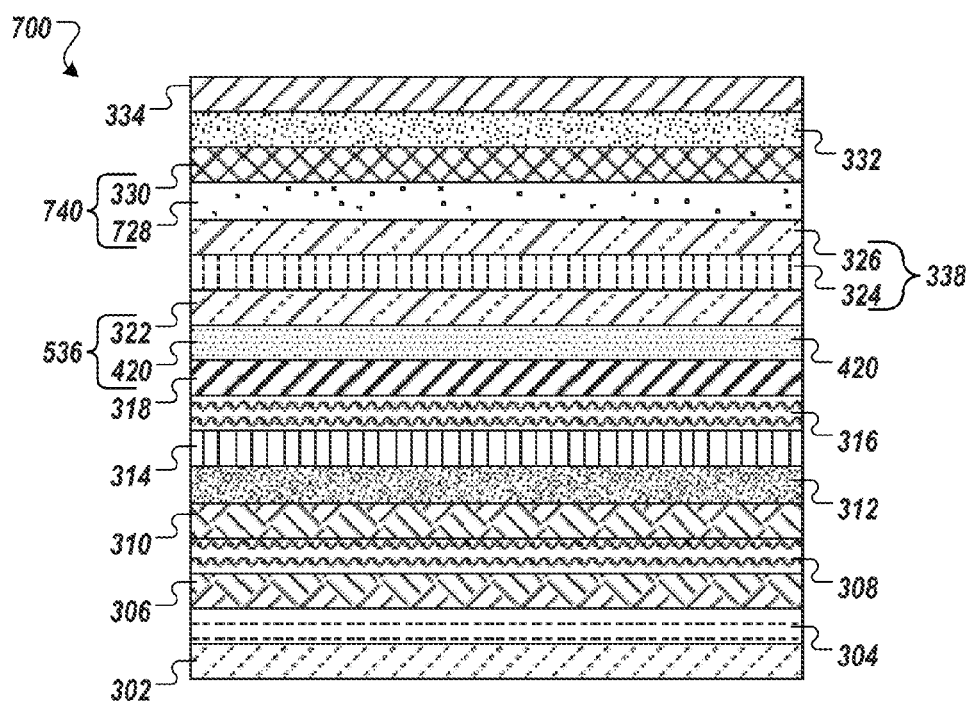
FIG. 7 is a cross-sectional view of a perpendicular magnetic recording medium according to a fifth embodiment of the present application.

FIG. 7 is a cross-sectional view of a perpendicular magnetic recording medium 700 according to a fifth embodiment. In FIG. 7, reference numerals matching reference numerals used in FIGS. 3-6 have been used to represent elements common between the first, second, third, fourth, and fifth embodiments. Redundant description of the common elements represented by matching reference numerals may be omitted.

In the embodiment of FIG. 7, the medium 700 includes an upper recording layer unit 740 including an upper magnetic layer 728 formed on the middle exchange breaking layer 326 and an upper exchange breaking layer 330 formed on the upper magnetic layer 728.

As in the embodiment of FIG. 7, the lower and middle magnetic layers 420, 324 of the medium 700 may be formed from a magnetic alloy containing one or more of Co, Pt, and Cr and grain boundary segregation materials formed from one or more of $SiO_2$, $Cr_2O_3$, and CoO. In some embodiments, the alloy of the lower and middle magnetic layers 420, 324 of the medium 700 may also include B. Further, the lower exchange breaking layer 322 and the middle exchange breaking layer 326 are formed from an alloy containing one or more of Co and Cr, and grain boundary segregation materials formed from $TiO_2$.

In the embodiment of FIG. 7, the upper magnetic layer 728 of the upper recording layer unit 740 includes an alloy of Co and Pt, and grain boundary segregation materials including MnO and one or more of $SiO_2$, $Cr_2O_3$, and CoO. In some embodiments, the alloy of the upper magnetic layer 728 may also include Cr, Ru, and B. Additionally, the upper exchange blocking layer 330 may be formed from an alloy containing Co and Ru.

Again, the processes of forming the above discussed layers of the medium 500 are not particularly limited and may include deposition processes (such as Chemical Vapor Deposition), sputtering processes, or any other process that may be apparent to a person of ordinary skill in the art.

In each of the above discussed embodiments illustrated in FIGS. 3-7, grain boundary segregation materials of one of the layers of a recording layer unit incorporate MnO. However, embodiments of the present application are not limited to MnO being incorporated into only one of layers of a single recording layer unit, and some embodiments of the present application may include MnO being incorporated into the grain boundary segregation materials of more than one layer of a single recording layer unit, or into multiple recording layer units.

By incorporating Manganese Oxide (MnO) into one or more layers of a recording layer unit, SNR and thermal stability of a recording medium of an embodiment of the present application may be improved without a lost in overwritability. However, embodiments of the present application need not demonstrate this improvement, or any other improvement.

While certain embodiments have been described, these embodiments have been presented by way of example only, and are not intended to limit the scope of the protection. Indeed, the novel apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A magnetic recording medium comprising:
    a substrate;
    at least a pair of magnetic layers formed over the substrate; and
    an exchange breaking layer formed between the pair of magnetic layers, wherein at least one magnetic layer of the pair of magnetic layers is formed from:
    an alloy containing Cobalt (Co), and Platinum (Pt), and
    grain boundary segregation materials comprising Manganese Oxide (MnO) and at least one of: Silicon Oxide (SiO2), Chromium Oxide (Cr2O3), and Cobalt Oxide (CoO).

2. The magnetic recording medium of claim 1, wherein the at least a pair of magnetic layers comprises:
    a first magnetic layer formed on the substrate;
    the exchange breaking layer formed on the first magnetic layer; and
    a second magnetic layer formed on the exchange breaking layer,
    wherein the first magnetic layer is formed from grain boundary segregation materials comprising SiO2, Cr2O3, CoO and MnO.

3. The magnetic recording medium of claim 2, wherein the exchange breaking layer is formed from grain boundary segregation materials comprising MnO and Titanium Oxide (TiO2).

4. The magnetic recording medium of claim 3, wherein the exchange breaking layer further comprises an alloy containing Co and Chromium (Cr).

5. The magnetic recording medium of claim 1, wherein the at least a pair of magnetic layers comprises:
    a first magnetic layer formed on the substrate;
    the exchange breaking layer formed on the first magnetic layer; and
    a second magnetic layer formed on the exchange breaking layer,
    wherein the second magnetic layer is formed from the grain boundary segregation materials comprising SiO2, Cr2O3, CoO and MnO.

6. The magnetic recording medium of claim 5, wherein the exchange breaking layer is formed from grain boundary segregation materials comprising MnO and TiO2.

7. The magnetic recording medium of claim 6, wherein the exchange breaking layer further comprises an alloy containing Co and Cr.

8. The magnetic recording medium of claim 1, wherein the at least a pair of magnetic layer comprises:
    a first magnetic layer formed on the substrate;
    a first exchange breaking layer formed on the first magnetic layer;
    a second magnetic layer formed on the first exchange breaking layer;
    a second exchange breaking layer formed on the second magnetic layer; and
    a third magnetic layer formed on the second exchange breaking layer;
    wherein the third magnetic layer is formed from the grain boundary segregation materials comprising SiO2, Cr2O3, CoO and MnO.

9. The magnetic recording medium of claim 8, wherein the second exchange breaking layer is formed from grain boundary segregation materials comprising MnO and TiO2.

10. The magnetic recording medium of claim 9, wherein the second exchange breaking layer further comprises an alloy containing Co and Cr.

11. A magnetic recording medium comprising:
    a substrate;
    a first magnetic layer formed on the substrate, wherein the first magnetic layer is formed from:
    an alloy containing Co, and Pt, and
    grain boundary segregation materials comprising at least one of: SiO2, Cr2O3, CoO; and
    at least one exchange breaking layer formed on the first magnetic layer, wherein the at least one exchange breaking layer is formed from:
    an alloy containing Co and Cr, and
    grain boundary segregation materials comprising MnO.

12. The magnetic recording medium of claim 11, wherein the at least one exchange breaking layer comprises grain boundary segregation materials further comprising TiO2.

13. The magnetic recording medium of claim 11, further comprising:
    a second magnetic layer formed on the at least one exchange breaking layer, wherein the second magnetic layer is formed from:
    an alloy containing Co, Pt, and B, and
    grain boundary segregation materials comprising at least one of: SiO2, Cr2O3, CoO.

14. The magnetic recording medium of claim 13, wherein the at least one exchange breaking layer comprises grain boundary segregation materials further comprising TiO2.

15. The magnetic recording medium of claim 11, wherein the at least one exchange breaking layer comprises:
    a first exchange breaking layer formed on the first magnetic layer; and
    a second exchange breaking layer;

wherein the magnetic recording medium further comprises:
a second magnetic layer formed on the first exchange breaking layer,
wherein the second exchange breaking layer is formed on the second magnetic layer, and
wherein the second magnetic layer is formed from:
an alloy containing Co, and Pt, and
grain boundary segregation materials comprising at least one of: SiO2, Cr2O3, CoO;
a third magnetic layer formed on the second exchange breaking layer,
wherein the third magnetic layer is formed from:
an alloy containing Co, and Pt, and
grain boundary segregation materials comprising at least one of: SiO2, Cr2O3, CoO;
wherein the first exchange breaking layer is formed from the grain boundary segregation materials comprising MnO.

16. The magnetic recording medium of claim 15, wherein the first exchange breaking layer comprises grain boundary segregation materials further comprising TiO2.

17. The magnetic recording medium of claim 11, wherein the at least one exchange breaking layer comprises:
a first exchange breaking layer formed on the first magnetic layer; and
a second exchange breaking layer;
wherein the magnetic recording medium further comprises:
a second magnetic layer formed on the first exchange breaking layer,
wherein the second exchange breaking layer is formed on the second magnetic layer, and
wherein the second magnetic layer is formed from:
an alloy containing Co, and Pt, and
grain boundary segregation materials comprising at least one of: SiO2, Cr2O3, CoO;
a third magnetic layer formed on the second exchange breaking layer,
wherein the third magnetic layer is formed from:
an alloy containing Co and Pt, and
grain boundary segregation materials comprising at least one of: SiO2, Cr2O3, CoO;
wherein the second exchange breaking layer is formed from the grain boundary segregation materials comprising MnO.

18. The magnetic recording medium of claim 17, wherein the first exchange breaking layer comprises grain boundary segregation materials further comprising TiO2.

19. A storage drive assembly comprising:
a base;
a spindle motor attached to the base, the spindle motor including a hub that rotates about a spindle rotation axis;
an annular magnetic recording medium mounted on the hub, the annular magnetic recording medium comprising at least one magnetic layer, wherein the at least one magnetic layer is formed from
an alloy containing Cobalt (Co), and Platinum (Pt), and
grain boundary segregation materials comprising Manganese Oxide (MnO) and at least one of Silicon Oxide (SiO2), Chromium Oxide (Cr2O3), and Cobalt Oxide (CoO); and
a read head disposed adjacent to the annular magnetic recording medium.

20. The storage drive assembly of claim 19, wherein the at least one magnetic layer comprises:
a first magnetic layer formed on a substrate;
an exchange breaking layer formed on the first magnetic layer; and
a second magnetic layer formed on first exchange breaking layer,
wherein the first magnetic layer is formed from the grain boundary segregation materials comprising SiO2, Cr2O3, CoO and MnO.

21. The storage drive assembly of claim 20, wherein the exchange breaking layer is formed from grain boundary segregation materials comprising MnO and Titanium Oxide (TiO2).

22. The storage drive assembly of claim 21, wherein the exchange breaking layer further comprises an alloy containing Co and Chromium (Cr).

23. The storage drive assembly of claim 19, wherein the at least one magnetic layer comprises:
a first magnetic layer formed on a substrate;
an exchange breaking layer disposed on the first magnetic layer; and
a second magnetic layer formed on the exchange breaking layer,
wherein the second magnetic layer is formed from the grain boundary segregation materials comprising SiO2, Cr2O3, CoO and MnO.

24. The storage drive assembly of claim 23, wherein the exchange breaking layer is formed from grain boundary segregation materials comprising MnO and TiO2.

25. The storage drive assembly of claim 24, wherein the exchange breaking layer further comprises an alloy containing Co and Cr.

26. The storage drive assembly of claim 19, wherein the at least one magnetic layer comprises:
a first magnetic layer formed on a substrate;
a first exchange breaking layer formed on the first magnetic layer;
a second magnetic layer formed on the first exchange breaking layer;
a second exchange breaking layer formed on the second magnetic layer; and
a third magnetic layer disposed on the second exchange breaking layer;
wherein the third magnetic layer is formed from the grain boundary segregation materials comprising SiO2, Cr2O3, CoO and MnO.

27. The storage drive assembly of claim 26, wherein the second exchange breaking layer is formed from grain boundary segregation materials comprising MnO and TiO2.

28. The storage drive assembly of claim 27, wherein the second exchange breaking layer further comprises an alloy containing Co and Cr.

* * * * *